United States Patent [19]

Lapin et al.

[11] Patent Number: 5,019,636
[45] Date of Patent: May 28, 1991

[54] POLYESTER CHAIN-EXTENDED VINYL ETHER URETHANE OLIGOMERS

[75] Inventors: Stephen C. Lapin, Wauconda; James R. Snyder, Chicago, both of Ill.

[73] Assignee: Allied-Signal Inc., Morris County, N.J.

[21] Appl. No.: 350,068

[22] Filed: May 10, 1989

[51] Int. Cl.$^5$ .................. C08L 29/10; C08G 18/67
[52] U.S. Cl. ........................ 526/301; 522/97; 528/49; 560/25; 560/115; 560/158
[58] Field of Search .............. 528/49; 522/97; 526/301; 560/25, 115, 158

[56] References Cited

U.S. PATENT DOCUMENTS

| | | | |
|---|---|---|---|
| Re. 33,211 | 5/1990 | Lapin et al. | 528/49 |
| 3,907,751 | 9/1975 | Knight et al. | 526/301 |
| 4,131,602 | 12/1978 | Hodakowski et al. | 528/49 |
| 4,422,914 | 12/1983 | Tsao et al. | 522/97 |
| 4,433,067 | 2/1984 | Rice et al. | 521/51 |
| 4,721,751 | 1/1988 | Schappert et al. | 528/49 |
| 4,734,480 | 3/1988 | Kotera et al. | 528/49 |
| 4,749,807 | 6/1988 | Lapin et al. | 560/91 |
| 4,751,273 | 6/1988 | Lapin et al. | 528/49 |
| 4,775,732 | 10/1988 | Lapin | 528/49 |

OTHER PUBLICATIONS

Lapin, Stephen C., Polyfunctional Vinyl Ether Terminated Ester Oligomers, Pat. Application SN 161,823 filed 02/29/88.

Crivello, J. V., *Advances in Polymer Sci.*, 64, pp. 1–48 (1984).

*Primary Examiner*—John Kight, III
*Assistant Examiner*—Dennis R. Daley
*Attorney, Agent, or Firm*—Harold N. Wells; Roger H. Criss; Gerard P. Rooney

[57] ABSTRACT

A vinyl ether oligomer especially useful for coatings is prepared by reacting an hydroxyl-terminated polyester, a diisocyanate, and a hydroxy monovinyl ether having formulas as defined herein.

37 Claims, No Drawings

POLYESTER CHAIN-EXTENDED VINYL ETHER URETHANE OLIGOMERS

PRIOR ART

This invention relates to oligomers which may be used for many purposes, particularly for coatings curable by electron beam, ultraviolet light, heating, or other means known to the art.

Acrylated urethanes are widely used in coating applications. However, the monomers present a health hazard and their replacement by resins which avoid the acrylate monomers would be desirable. Consequently, vinyl ethers have become of interest. Acrylated urethanes and vinyl ether urethanes are very different in that the acrylate derivatives are radical polymerized, while vinyl ether derivatives are cationically polymerized. An advantage for vinyl ethers is that oxygen does not inhibit polymerization and thus the processing is simplified.

In U.S. Pat. No. 4,751,273 one of the present inventors disclosed vinyl ether terminated urethane resins for use in coatings. A hydroxy monovinyl ether was formed by reaction of acetylene with a polyol and this product was reacted with an isocyanate to produce the resin (an oligomer). It was suggested that prepolymers of the isocyanate could be substituted but no particular advantage for such materials was implied, nor were polyesters suggested as being useful.

A related patent U.S. Pat. No. 4,749,807 describes a vinyl ether terminated ester oligomer in which the hydroxy monovinyl ether was reacted with a carboxylic acid, more especially an activated derivative such as a chloride or an ester. Urethanes were not included in such oligomers.

Specific diols were found to be advantageous as precursors for hydroxy monovinyl ethers used to produce both vinyl ether terminated esters and urethanes in U.S. Pat. No. 4,775,732. More particularly, bis(hydroxyalkyl)cycloalkanes were found to provide coatings having improved adhesion to metal substrates. Although both esters and urethanes were suggested, they were considered as separate technologies.

Still another application (Ser. No. 161,823-now allowed) disclosed the advantages for the use of tricarboxylic acids or higher acids in preparing vinyl ether terminated ester oligomers having excellent solvent resistance. Again, urethanes were not included in such oligomers.

The disclosures of each of the above patents and the application are incorporated herein by reference for more detailed descriptions of those inventions.

Continuing development of new coatings based on the oligomers discussed above has indicated that further improvement is needed in certain applications. In particular, better control of flexibility, hardness, moisture resistance, and color are needed. The inventors have found that the oligomers to be described have superior properties in coating formulations, as will be seen below.

SUMMARY OF THE INVENTION

A vinyl ether oligomer especially useful for preparing coatings is obtained by reacting (a) an hydroxyl-terminated polyester having the formula $$HO-X+O-\overset{O}{\underset{\|}{C}}-Y-\overset{O}{\underset{\|}{C}}-O-X)_{\overline{m}}OH$$

where
X and Y are divalent radicals having a molecular weight of 28 to about 500 and selected from the group consisting of alkylene, arylene, aralkylene, and cycloalkylene radicals
m has an average value of 1 to about 100
and (b) a diisocyanate having the formula $$OCN-Q-NCO$$

where Q is a divalent radical selected from the group consisting of alkylene, arylene, aralkylene, and cycloalkylene radicals
or a polyisocyanate having a functionality of 2 or more
and (c) a hydroxy monovinyl ether having the formula $$R'CH=CR''O-Z-OH$$

R' and R" are mono valent radicals selected from the group consisting of H and alkyl groups having 1-10 carbon atoms
where Z is a divalent radical having a molecular weight of 28 to about 500 and selected from the group consisting of alkylene or cycloalkylene radicals The oligomers may be prepared by co-reacting all three components (a), (b), and (c) or alternatively, reacting (a) with (b) or (b) with (c) first followed by further reaction with the third component.

The amount of (a); (b); (c) should be adjusted, so that the ratio of the hydroxyl groups from (a) and (c) to the isocyanate groups from (b) is about 1:1. The ratio of the total number of hydroxyl groups from (a) to the total number of hydroxyl groups from (c) should be in a range from about 0.5 to 5. Ideally, there should be no excess of hydroxyl groups, preferably less than 10 mol. %, most preferably less than 1 mol. % of such groups initially present. Also, there should be no excess isocyanate groups in the oligomer, preferably less than 1 mol. % of such groups initially present.

The oligomers may be cured to polymers by various known techniques such as by electon beam, ultraviolet radiation, and heating.

DESCRIPTION OF PREFERRED EMBODIMENTS

Reactants
Polyesters
Polyesters useful in this invention are hydroxyl-terminated and may be generally defined by the formula $$HO-X+O-\overset{O}{\underset{\|}{C}}-Y-\overset{O}{\underset{\|}{C}}-O-X)_{\overline{m}}OH$$

where
X and Y are divalent radicals having a molecular weight of 28 to about 500 and selected from the group consisting of alkylene, arylene, aralkylene and cycloalkylene radicals
m has an average value of 1 to about 100

The moieties X and Y may be alkylene groups, especially those containing up to about 20 carbon atoms, a cycloalkylene group, an arylene, or aralkylene group.

Examples of the alkylene moieties which may be used include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, and eicosylene. Examples of arylene groups include phenylene, naphthylene, anthrylene, phenanthrylene, etc. Cycloalkylene groups include the cyclopentylene, cyclohexylene, cycloheptylene, cyclooctylene, and cycloalkylene groups containing 1 or more alkyl groups on the nucleus. Similarly, the arylene groups which may be used for Y also may contain one or more alkyl groups on the aromatic ring, especially where such alkyl groups contain up to about 6 carbon atoms. Examples of aralkylene groups include benzylene, 1-phenethylene, 2-phenethylene, 3-phenylpropylene, 2-phenylpropylene, 1-phenylpropylene, etc. Particularly useful Y groups are $-n-$ groups where n is 2, 3, or 4; 1,2, 1,3, or 1,4 phenylene groups; and 1,4-cyclohexylene groups. Particularly useful X groups are $-CH_2CH_2-$; $-CH_2CH_2-O-CH_2CH_2-$; $-CH_2-(CH_3)CH-$; $-(CH_2)_n-$ where n is 4 or 6; $-CH_2-(CH_3)_2C-CH_2-$; 1,4 phenylene; and 1,4-bis(methyl)phenylene.

M will be an integer from 1 to about 100, preferably from 1 to 10.

Particularly preferred hydroxyl-terminated polyesters include poly(propylene adipate), poly(neopentyl adipate), poly(1,4-butane adipate), poly(1,6-hexane adipate), poly(neopentyl isophthalate), and poly(1,6-hexane isophthalate). Polyesters derived from mixed diols or acids may be useful. The preferred molecular weights for the polyesters will be about 500 to 5000.

Diisocyanates

A diisocyanate useful in the invention may be generically described by the formula, OCN—Q—NCO where Q is a divalent radial selected from the group consisting of alkylene, arylene, aralkylene, and cycloalkylene radicals.

A broad variety of diisocyanates may be used and may be exemplified by such materials as the toluene diisocyanates (TDI), p- and m-phenylene diisocyanate, 1,4-tetramethylene diisocyanate, 1,6-hexamethylene diisocyanate, 2,2,4-trimethylhexamethylene diisocyanate, 1,4-cyclohexane diisocyanate, 4,4'-dicyclohexylmethane diisocyanate (Desmodur W), 4,4'-diphenylmethane diisocyanate (MDI), 3,3'-dimethyl-4,4-diphenylmethane diisocyanate, 1,5-tetrahydronaphthalene diisocyanate, naphthalene-1,5'-diisocyanate, bis(2-methyl-3-isocyanatephenyl)methane, 4,4'-diphenylpropane diisocyante, tetramethylxylene diisocyanate (TMXDI), isophorone diisocyanate (IPDI).

Polyisocyanates with a functionality of 2 or more such as are described and discussed in U.S. Pat. No. 4,433,067, especially the polyisocyanates based on methylenediphenyl diisocyanate, especially the 4,4'-isomer and the uretonimine modified MDI as described there, also may be utilized. The term polyisocyanate also includes quasi prepolymers of polyisocyanates with active hydrogen containing materials where the polyisocyanate is typically reacted with from about 0.05 to about 0.3 equivalents of a polyol. Although a vast number of polyisocyanates are suitable, in practice polyisocyanates based on MDI and TDI may be preferred for economy and general availability. However, aliphatic isocyanates exhibit non-yellowing properties which are especially important for coatings.

Among the most desirable isocyanates may be mentioned 4,4'-diphenylmethane diisocyanate, toluene diisocyanate, isophorone diisocyanate, m-tetramethylxylene diisocyanate, 4,4'-dicyclohexylmethane diisocyanate (Desmodur W), and 1,6-hexamethylene diisocyanate.

Hydroxy Monovinyl Ethers

The vinyl ether terminated alcohols which are used in preparing the oligomeric esters of this invention have a structure corresponding to the adduct of an alkyne and a diol. However, these vinyl ether terminated alcohols also can be made in other ways, and the method of producing them is not part of this invention. The alkyne has the generic formula R'C≡CR", and the diol has the generic formula HO-Z-OH. The generic formula of the vinyl ether terminated alcohols of our invention is

R'CH=CR"O—ZOH.

The groups R' and R" are independently selected from the group consisting of hydrogen and lower alkyl moieties containing from 1 to 10 carbon atoms, although those with from 1 to about 4 carbon atoms are favored. It is preferable that both R' and R" are not alkyl moieties, for in the case where both are lower alkyl groups this causes an undesirable reduction in polymerization rate of the oligomers of our invention. Where R' is an alkyl moiety it is preferred that R" be hydrogen, and conversely; where R' is hydrogen then R" should be an alkyl of 1 to 4 carbons. In a preferred embodiment R' or R" is a methyl group and R" and R' is hydrogen. In a still more preferred embodiment both R' and R" are hydrogen.

Z will be a divalent radical having a molecular weight of 28 to about 500 and selected from the group consisting of alkylene or cycloalkylene radicals.

Among the diols one important class consists of alkylene glycols, $HO(C_nH_{2n})OH$, where n is an integer from 2 to about 10. The linear alkylene glycols, $HO(CH_2)_nOH$, (polymethylenediols), where n is an integer from 2 to about 10, are particularly useful, especially where n is from 2 to about 6. Illustrative of the members of this group are such diols as ethylene glycol, 1,3-propylene glycol, 1,4-butanediol, 1,5-pentanediol, 1,6-hexanediol, 1,7-heptanediol, 1,8-octanediol, 1,9-nonanediol, and 1,10-decanediol (decamethylene glycol)

The nonlinear or branched alkylene diols also may be used, where such glycols contain from 3 up to about 10 carbon atoms. Examples include 1,2-propylene glycol, 2,3-butanediol, 2,3-dimethyl-2-3-butanediol, 2,3-dimethyl-1,4-butanediol, 2,2-dimethyl-1,3-propanediol(-neopentylglycol).

Another useful class of diols are the polyalkylene glycols, especially poly(ethylene) glycols, HO[—CH_2CH_2O—]_mOH, and poly(polypylene) glycol, HO[—CH(CH_3)CH_2O—]_mOH, where m is an integer from 1 up through about 50, although more usually m is an integer from 1 up to about 10, and most preferably from 1 up to about 5. Examples of these glycols include diethylene glycol, triethylene glycol, tetraethylene glycol, pentaethylene glycol, hexaethylene glycol, etc., along with the analogs of the propylene glycols.

Of particular importance is the case where Z is a divalent radical whose parent is a cycloalkane, such as cyclopentane, cyclohexane, cycloheptane, or cyclooctane, preferably the bishydroxy alkyl derivatives. The preferred diols are the 1,3-bis(hydroxyalkyl)cyclopentanes and the 1,4-bis(hydroxyalkyl)cyclohexanes, -cycloheptanes, and -cyclooctanes, particularly the cyclohexanes. Diols substituted at positions different from those specified above may be used in the practice this invention, but not necessarily with equivalent results The bis(hydroxymethyl)cyclohexanes are preferred as they are available from the reduction of the corresponding phthalic acids, and among these 1,4-bis(hydroxymethyl)cyclohexane is favored.

Of the hydroxy monovinyl ethers which are produced by the reaction of acetylene with the diols described above, those which are especially preferred include 4-hydroxybutyl vinyl ether, 4-hydroxymethyl cyclohexylmethyl vinyl ether, 2-hydroxy ethyl vinyl ether, triethylene glycol monovinyl ether, and diethylene glycol monovinyl ether Reaction Conditions An important characteristic of the invention is that in all cases there are few hydroxyl groups derived from the polyester or hydroxy monovinyl ether in the final product. That is, less than about 10% of the initial hydroxyl groups remain unreacted. It is most preferable that the oligomeric vinyl ether terminated product contain no detectable free hydroxyl groups, i.e., less than about 1% of the initial hydroxyl groups of the reactant mixture remain unreacted. It is also important that there should be essentially no free isocyanate groups remaining in the product, that is, less than about 1% of the initial isocyanate groups of the reactant mixture. In general, the ratios of polyester (a), diisocyanate (b) and monovinyl ether (c) are selected to provide an equal number of equivalents of hydroxyl and isocyanate groups.

The vinyl ether oligomers may be formed by reacting the hydroxyl-terminated polyester (a) with the isocyanate compound (b) or by reacting the isocyanate (b) with the hydroxy vinyl ether (c) and thereafter reacting the adduct with the remaining component or alternatively, the three components may be co-reacted. The ratios of (a), (b), and (c) will be chosen so that the ratio of the total number of hydroxyl groups from (a) and (c) to the number of isocyanate groups from (b) is about 1:1. The ratio of the number of hydroxyl groups from (a) to the number of hydroxyl groups from (c) should be in the range from about 0.5 to 5. The reaction may be carried out at temperatures in the range of 0° to 150° C. Solvents such as diethyl ether, methylene chloride, or toluene may be employed and later removed from the oligomers, or the components may be reacted in the absence of solvents. Divinyl ether monomers such as 1,4-cyclohexane dimethanol divinyl ether or triethylene glycol divinyl ether may also be used as solvents Such compounds may be obtained as by-products in the preparation of hydroxy monovinyl ethers Since they have no free hydroxyl groups they do not react with the isocyanates, but may remain with the oligomers in the formulations of coatings.

The reaction may be carried out without a catalyst, but a tin containing catalyst such as dibutyl tin dilaurate may be used.

The vinyl ether oligomers of this invention may be cured or polymerized by methods known in the art and applied as coatings, foams, and elastomers. For example, as coatings the resins may be radiation cured, as for example by being subjected to an electron beam of an energy in the range from about 50 up to perhaps 500 KeV with a dosage from about 0.1 to about 10.0 Mrads. Electron beam curing may be performed advantageously in the presence of an iodonium or a sulfonium salt to afford high speed cationic polymerization. Ultraviolet curing in the presence of an onium salt also may be effected to afford cationic polymerization. Radiation activated cationic initiators have been reviewed by J. V. Crivello, *Advances in Polymer Sci*, 64, pp. 1–48 (1984). Other means include thermal curing in the presence of a Lewis acid, such as boron trifluoride, or in the presence of a strong acid such as p-toluenesulfonic acid and trifluoromethylsulfonic acid. Latent thermal catalysts which release a strong acid upon heating, e.g. blocked sulfonic acid may also be used. All these methods of polymerization are well known to those skilled in the art.

EXAMPLE 1

Synthesis of a Polyester Chain Extended Vinyl Ether Urethane Oligomer 1,4-Cyclohexane dimethanol divinyl ether (CDDVE, 160.6 grams) and MDI (140.5 g, 0.56 mol) were added to a resin kettle which was heated to 50° C. under a dry nitrogen atmosphere. Hydroxy terminated poly(neopentyl adipate) (Witco Formrez 55-225, 138.9 g, 0.56 eq OH) was combined with 10 drops of dibutyltindilaurate and the mixture was added dropwise to the resin kettle over a period of about one hour while maintaining the reaction temperature between 50° and 60° C. 4-Hydroxymethyl cyclohexylmethyl vinyl ether (CDMVE), (95.4 g, 0.56 mol) was then added dropwise to the mixture. The reaction was followed by IR spectroscopy. After stirring the mixture at 55° to 60° C. for 2.5 hours, the IR band at 2250 cm-1 from the NCO group was no longer detectable. The product was a clear thick liquid. GPC analysis (polystyrene standards) showed Mn=2,000 and Mw=3,500.

EXAMPLE 2

Radiation Curing of a Polyester Chain Extended Vinyl Ether Urethane Oligomer

The material produced in Example 1 was combined with a triaryl sulfonium salt catalyst (General Electric UVE-1016, 2 pph) and was coated onto treated steel or a polyethylene coated paper board substrate with a No. 6 wire wound rod. The coatings were UV cured using a RPC Model QC-1202 UV processor equipped with two medium pressure mercury arc lamps. The coatings were EB cured using an Energy Sciences Model CB-150 Electrocurtain unit equipped with a 15 cm linear cathode (operated at 160 KeV). Clear, colorless, or lightly colored, tack-free films were produced immediately upon irradiation. The coatings were evaluated within one hour after irradiation. The coatings were examined for solvent resistance using methyl ethyl ketone. The number of double rubs necessary to break through the coating was recorded Reverse impact was measured on the steel panels using a Gardner impact tester according to ASTM Method D2794. The coating elongation was measured by bending the coated steel panel over a conical mandrel according to ASTM Method D522. Adhesion was measured according to ASTM D3359 using Scotch 610 adhesive tape. Pencil hardness was measured according to ASTM D3363. The results are summarized in the table below:

| Curing Conditions | MEK rubs on PE | Adhesion (%) PE/Steel | Pencil Hardness on Steel | Elongation (%) | Reverse Impact (in-lbs) |
|---|---|---|---|---|---|
| UV Air 250 mj/cm2 | >100 | 74/6 | 3H | >50 | 10 |
| UV N2 250 mj/cm2 | >100 | 94/16 | 5H | >50 | <5 |
| UV N2 100 mj/cm2 | >100 | 60/2 | 5H | >50 | 10 |
| EB 10 Mrads | >100 | 30/0 | 6H | >50 | <5 |
| EB 5 Mrads | >100 | 46/0 | 5H | >50 | 10 |
| EB 2 Mrads | <30 | 88/72 | 5H | >50 | 20 |

EXAMPLE 3

A polyester chain extended vinyl ether urethane oligomer was prepared by reacting MDI (137.9 g, 0.55 mol), hydroxyl-terminated poly(propylene adipate)(Formrez 33–225, 139.1 g, 0.55 eq OH), and CDMVE (93.8 g, 0.55 mol) in 168.9 g of CDDVE. The procedure was the same as in Example 1. The product was a thick clear liquid. GPC analysis showed Mn=1,900 and Mw=3,200.

EXAMPLE 4

The product prepared in Example 3 was combined with the triaryl sulfonium salt and was coated and cured by the same procedure described in Example 2. The results are summarized in the table below.

| Curing Conditions | MEK rubs on PE | Adhesion % PE/Steel | Pencil Hardness on Steel | Elongation (%) | Reverse Impact (in-lbs) |
|---|---|---|---|---|---|
| UV Air 250 mj/cm2 | >100 | 100/100 | 3H | >50 | 10 |
| UV Ari 100 mj/cm2 | >100 | 100/100 | 2H | >50 | 15 |
| UV Air 30 mj/cm2 | 80 | 100/100 | 2H | >50 | <15 |
| EB 10 Mrads | >100 | 100/20 | 3H | >50 | <5 |
| EB 5 Mrads | >100 | 100/24 | 3H | >50 | <5 |
| EB 2 Mrads | 90 | 100/100 | 4H | >50 | 5 |

EXAMPLE 5

A polyester chain extended vinyl ether urethane oligomer was prepared by reacting MDI (136.2 g, 0.54 mol), hydroxyl-terminated poly(propylene adipate)(137.4 g, 0.54 eq OH), and 4-hydroxy butyl vinyl ether (62.7 g, 0.54 mol) in 112.1 grams of CDDVE. The procedure was the same as in Example 1. The product was a soft white waxy solid. GPC analysis showed Mn=1,700 and Mw=3,000.

EXAMPLE 6

The product prepared in Example 5 was combined with the triaryl sulfonium salt and was coated and cured by the same procedure used in Example 2. The results are summarized below:

| Curing Conditions | MEK rubs on PE | Adhesion % PE/Steel | Pencil Hardness on Steel | Elongation (%) | Reverse Impact (in-lbs) |
|---|---|---|---|---|---|
| UV Air 250 mj/cm2 | >100 | 100/92 | 2H | 22.6 | 15 |
| UV N2 250 mj/cm2 | >100 | 100/78 | 2H | >50 | 10 |
| UV N2 100 mj/cm2 | >100 | 100/96 | 2H | >50 | 20 |
| UV N2 30 mj/cm2 | >100 | 80/100 | 3H | >50 | >60 |
| EB 15 Mrads | >100 | 100/14 | 3H | >50 | 10 |
| EB 5 Mrads | >100 | 100/0 | 3H | >50 | 15 |
| EB 2 Mrads | 30 | 14/0 | 4H | >50 | 10 |

EXAMPLE 7

A polyester chain extended vinyl urethane oligomer was prepared by reacting isophorone diisocyanate (72.9 g, 0.33 mol), hydroxyl-terminated poly(propylene adipate)(82.7 g, 0.33 eq OH), and 4-hydroxy butyl vinyl ether (37.7 g, 0.33 mol) in 64.4 grams of CDDVE. The product was a clear liquid material. GPC analysis showed Mw=1,500 and Mn=2,200.

EXAMPLE 8

The product from Example 7 was combined with a triaryl sulfonium salt catalyst and was coated and cured by the same procedure used in Example 2. The results are summarized in the table below:

| Curing Conditions | MEK rubs on PE | Adhesion % PE/Steel | Pencil Hardness on Steel | Elongation (%) | Reverse Impact (in-lbs) |
|---|---|---|---|---|---|
| UV Air 250 mj/cm2 | 70 | 60/0 | 2H | >50 | >160 |
| UV N2 250 mj/cm2 | 60 | 100/0 | 3H | >50 | >160 |
| UV N2 500 mj/cm2 | >100 | 16/0 | 3H | >50 | >160 |
| EB 10 Mrads | 60 | 60/0 | 2H | >50 | >160 |

EXAMPLE 9

The synthesis of the material produced in Example 5 was repeated except that triethylene glycol divinyl ether was used as a monomer diluent in place of CDDVE. The product was a soft white waxy solid. GPC analysis showed Mn=1,700 and Mw=3,300.

EXAMPLE 10

The product from Example 9 was combined with the triaryl sulfonium salt and was coated and cured by the same procedure used in Example 2. The results are summarized in the table below:

| Curing Conditions | MEK rubs on PE | Adhesion % PE/Steel | Pencil Hardness on Steel | Elongation (%) | Reverse Impact (in-lbs) |
|---|---|---|---|---|---|
| UV Air 250 mj/cm2 | >100 | 100/12 | 6H | >50 | >160 |
| UV Air 250 mj/cm2 | >100 | 96/18 | 6H | >50 | >160 |
| UV N2 100 mj/cm2 | >100 | 68/35 | 6H | >50 | >160 |
| EB | >100 | 98/96 | 7H | >50 | >160 |

| Curing Conditions | MEK rubs on PE | Adhesion % PE/Steel | Pencil Hardness on Steel | Elongation (%) | Reverse Impact (in-lbs) |
|---|---|---|---|---|---|
| 10 Mrads EB | >100 | 42/66 | 6H | >50 | >160 |
| 5 Mrads EB | 50 | 14/78 | 6H | >50 | >160 |
| 2 Mrads | | | | | |

EXAMPLE 11

This example illustrates the use of a higher molecular weight polyester chain extending group. Hydroxyl-terminated poly(propylene adipate) was used (Mn=2000 vs. Mn=500 used in Examples 3, 5, 7, and 9. Thus, a polyester chain extended vinyl ether urethane oligomer was prepared by reacting MDI (66.9 g, 0.267 mol), poly(propylene adipate)(Formrez 33–56, 276.1 g, 0.267 eq OH), and CDMVE (45.5 g, 0.267 mol) in 68.5 CDDVE. The procedure was the same as in Example 1. The product was a clear thick liquid.

EXAMPLE 12

This example illustrates how the properties of the cured coating may be adjusted by varying the amount of the VEU oligomer, and vinyl ether monomer in the coating formulation. The oligomer in Example 11 was synthesized in the presence of 15% CDDVE monomer. Varying amounts of additional CDDVE monomer along with the triaryl sulfonium salt (2 pph) were added to the oligomer. The mixtures were coated and UV cured by the method described in Example 2. The results are shown in the table.

| Oligomer (%) | Monomer (%) | Reverse Impact[a] (in-lbs) | Elongation[a] (%) | Pencil Hardness[a] | MEK Rubs[b] |
|---|---|---|---|---|---|
| 85 | 15 | 160 | >50 | H | 45 |
| 75 | 25 | 90 | >50 | B | 80 |
| 55 | 45 | <5 | 6 | H | >100 |
| 35 | 65 | <5 | 4 | 3H | >100 |

[a]After UV curing at 250 mj/cm2
[b]After UV curing at 30 mj/cm2. All mixtures gave >100 rubs at 250 mj/cm2.

The coatings became more hard and brittle as more monomer was added (160 in-lbs reverse impact and >50% elongation at 15% monomer vs. <5 in-lbs reverse impact and 4% elongation at 65% monomer). These results may be attributed to the effect of the monomer, which contributes to the crosslink density of the cured coating relative to the oligomer.

EXAMPLE 13

This example illustrates the case where the polyester chain extending group is derived from a mixture of two different diols. A hydroxyl-terminated polyester derived from reacting adipic acid with a mixture of ethylene glycol and 1,4-butane diol (Witco Formrez E24–56) was used. Thus, a polyester chain extended vinyl ether urethane was prepared by reacting MDI (68.9 g, 0.275 mol), poly(ethylene/butane adipate)(273.0 g, 0.275 eq OH), and 4-hydroxy butyl vinyl ether (31.7 g, 0.275 mol) in 41.8 of CDDVE. The procedure was the same as in Example 1. The product was a slightly cloudy, thick liquid.

EXAMPLE 14

The product prepared in Example 13 was combined with the triaryl sulfonium salt and was coated and cured by the same procedure described in Example 2. The results are summarized in the table below:

| Curing Conditions | MEK rubs on PE | Adhesion PE/Steel (%) | Pencil Hardness on Steel | Elongation (%) | Reverse Impact (in-lbs) |
|---|---|---|---|---|---|
| UV Air 250 mj/cm2 | >100 | 100/56 | B | >50 | >160 |
| UV N2 250 mj/cm2 | >100 | 100/26 | B | >50 | >160 |
| UV N2 100 mj/cm2 | >100 | 100/34 | B | >50 | >160 |
| UV N2 30 mj/cm2 | 40 | 100/66 | 3B | >50 | >160 |
| EB 10 Mrads | 100 | 100/0 | B | >50 | >160 |
| EB 5 Mrads | 35 | 100/36 | B | >50 | >160 |
| EB 2 Mrads | 30 | 100/28 | B | >50 | >160 |

EXAMPLE 15

An oligomer may be prepared in the absence of any divinyl ether monomer. In previous Examples (1, 3, 5, 7, 9, 11, and 13) the oligomers were prepared in the presence of a divinyl ether monomer (CDDVE or TEGDVE). In this example, no monomer diluents were used. Thus, MDI (53.1 g, 0.212 mol) was added to a resin kettle which was heated to 60° C. under a dry nitrogen atmosphere. Hydroxyl-terminated poly(propylene adipate) (Witco Formrez 33–56, 219.6 g, 0.212 eq OH) along with 8 drops of dibutyl tin dilaurate, were added dropwise from a heated addition funnel (70° C.) over a period of about one hour. The mixture was stirred for an additional hour at 60° C. after the addition was complete. CDMVE (36.1 g, 0.212 mol) was then added dropwise to the mixture while maintaining a temperature of 60° C. After another 2 hours at 60° C., the NCO IR band at 2250 cm-1 was no longer detectable. The product was a very high viscosity clear liquid.

EXAMPLE 16

The product of Example 15 was combined with the triaryl irradiation at 250 mj/cm$^2$ as previously described. The cured coating had a reverse impact strength of >160 in lbs and elongation of >50%. Pencil hardness was 2B and the coating resisted 40 double rubs with methyl ethyl ketone.

EXAMPLE 17

Comparative

This example provides a comparison of materials described in U.S. Pat. No. 4,751,273 to materials described in the examples above. In U.S. Pat. No. 4,751,273 a mixture of products from the reaction of acetylene with a diol were used in the synthesis of vinyl ether terminated urethane resins (col. 5 line 4–29). Thus a mixture of triethylene glycol divinyl ether (40.0 g, 0.2 mol), triethylene glycol monovinyl ether (14.1 g, 0.08 mol), and triethylene glycol (6.0 g, 0.04 mol) was reacted with 4,4'-diphenyl methane diisocyanate (20.0 g, 0.08 mol). An exothermic reaction began within a few minutes after the addition of 5 drops of dibutyl tin dilaurate catalyst. The temperature was regulated to a maximum of 70 C with an ice water bath. After stirring for four hours the temperature dropped to 30 C. IR analysis showed no detectable-NCO band remaining in the sample. The product was a thick clear liquid. GPC analysis (polystyrene standards) showed Mn=462, Mw= 1,464 (including a contribution from the triethylene glycol divinyl ether, 202 g/mol).

This product was coated and UV cured at 75 mj/cm² by the procedure described in Example 2. The cured coating resisted >100 MEK rubs. Pencil hardness was 3H. Reverse impact was >160 in-lbs and elongation to break was >50%. These properties are comparable to the materials of the present invention. However, the coating described in this example showed a dark yellow-brown coloration within one week after curing while the materials described in the present invention show little or no discoloration. In addition, coatings based on polyethers (such as the triethylene glycol shown in this example) have an undesirable property in that they tend to absorb moisture from the surrounding environment.

U.S. Pat. No. 4,775,732 discloses vinyl ether functionalized urethane oligomers based on bis(hydroxyalkyl)-cyclolkanes such as 1,4-bis(hydroxymethyl)cyclohexane. These materials do not contain polyether structures and there were few problems with moisture absorption and discoloration as in Example 17 above. One problem, however, with these materials was that they tended to have poor flex properties. This was illustrated in Example III of U.S. Pat. No. 4,775,732 where the elongation of the cured coating was only 14% and the reverse impact strength was only 15 in-lbs. The flex properties were improved in the present invention by incorporating polyester chain extending groups, as may be seen from the data in Examples 2, 4, 6, 12, 14, and 16.

We claim:
1. A vinyl ether urethane oligomer consisting essentially of the reaction product of (a) an hydroxyl-terminated polyester having the formula

$$HO-X+O-\overset{O}{\overset{\|}{C}}-Y-\overset{O}{\overset{\|}{C}}-O-X)_{m}OH$$

where
X is a divalent radical selected from the group consisting of

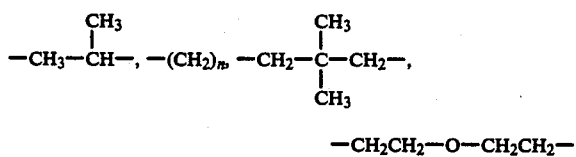

—CH₂CH₂—O—CH₂CH₂— where n is an integer from 2 to 6
Y is a divalent radical selected from the group consisting of —(CH₂)ₙ—
where
n is 2,3,4 and 1,2, 1,3, or 1,4 phenylene groups
m has an average value of 1 to about 100
and (b) a diisocyanate having the formula

OCN—Q—NCO where
Q is selected from the group consisting of divalent radicals derived from toluene, 4,4'-diphenylmethane, tetramethyl xylene, isophorone, and 4,4'-dicyclohexylmethane and n-hexane
or a polyisocyanate having a functionality of 2 or more
and (c) a hydroxy monovinyl ether having the formula

R'CH"=CR"O—Z—OH where
R' and R" are monovalent radicals selected from the group consisting of H and alkyl groups having 1-10 carbon atoms
Z is selected from the group consisting of divalent radicals derived from butane diol, 1,4-bis(methyl)-cyclohexane diol, ethylene glycol, diethylene glycol, triethylene glycol, propylene glycol, dipropylene glycol, and tripropylene glycol.

2. The oligomer of claim 1 where polyester (a) is first reacted with diisocyanate (b) and thereafter the first reaction product is reacted with the monovinyl ether (c).

3. The oligomer of claim 1 where diisocyanate (b) and monovinyl ether (c) are first reacted and thereafter the first reaction product is reacted with the polyester (a).

4. The oligomer of claim 1 wherein (a), (b) and (c) are co-reacted.

5. The oligomer of claim 1 wherein the ratio of the hydroxyl groups of (a) to the hydroxyl groups of (c) is about 0.5 to 5 and the ratio of the hydroxyl groups (a) and (c) to the isocyanate groups of (b) is about 1:1.

6. The oligomer of claim 1 wherein (a), (b), and (c) are reacted in the absence of a solvent.

7. The oligomer of claim 1 wherein (a), (b), and (c) are reacted in the presence of a divinyl ether monomer which is retained with the oligomer.

8. The oligomer of claim 1 wherein (a), (b), and (c) are reacted in the presence of a solvent which is removed from the oligomer.

9. The oligomer of claim 1 wherein the excess hydroxyl groups are less than 10 mol percent of those initially present.

10. The oligomer of claim 9 wherein the excess hydroxyl groups are less than 1 mol percent of those initially present.

11. The oligomer of claim 1 wherein the excess isocyanate groups are less than 1 mol percent of those initially present.

12. The oligomer of claim 1 wherein polyester (a) is hydroxyl-terminated poly(neopentyl adipate), diisocyanate (b) is 4,4'-diphenyl methane diisocyanate, and monovinyl ether (c) is 4-hydroxymethyl cyclohexylmethyl vinyl ether.

13. The oligomer of claim wherein polyester (a) is hydroxyl-terminated poly(propylene adipate), diisocyanate (b) is 4,4'-diphenylmethane diisocyanate, and monovinyl ether (c) is 4-hydroxymethyl cyclohexylmethyl vinyl ether.

14. The oligomer of claim 1 where polyester (a) is hydroxyl-terminated poly(propylene adipate), diisocyanate (b) is 4,4'-diphenylmethane diisocyanate, and monovinyl ether (c) is 4-hydroxybutyl vinyl ether.

15. The oligomer of claim 1 wherein polyester (a) is hydroxy-terminated poly (propylene adipate), diisocyanate (b) is isophorone diisocyanate, and monovinyl ether (c) is 4-hydroxy butyl vinyl ether.

16. The oligomer of claim 1 wherein in polyester (a) X and/or Y are mixtures of two or more different divalent radicals.

17. The oligomer of claim 1 wherein the polyester (a) is hydroxyl-terminated poly(propylene adipate).

18. The oligomer of claim 1 wherein the polyester (a) is hydroxyl-terminated poly(neopentyl adipate).

19. The oligomer of claim 1 wherein the polyester (a) is hydroxyl-terminated poly(1,4-butane adipate).

20. The oligomer of claim 1 wherein the polyester (a) is hydroxyl-terminated poly(1,6-hexane adipate).

21. The oligomer of claim 1 wherein the polyester (a) is hydroxyl-terminated poly(neopentyl isophthalate).

22. The oligomer of claim 1 wherein the polyester (a) is hydroxyl-terminated poly(1,6-hexane isophthalate).

23. The oligomer of claim 1 wherein the diisocyanate (b) is 4,4'-diphenyl methane diisocyanate.

24. The oligomer of claim 1 wherein the diisocyanate (b) is toluene diisocyanate.

25. The oligomer of claim 1 wherein the diisocyanate (b) is isophorone diisocyanate.

26. The oligomer of claim 1 wherein the diisocyanate (b) is m-tetramethyl xylene diisocyanate.

27. The oligomer of claim 1 wherein the diisocyanate (b) is 4,4'-dicyclohexyl methane diisocyanate.

28. The oligomer of claim 1 wherein the diisocyanate (b) is 1,6-hexamethylene diisocyanate.

29. The oligomer of claim 1 wherein the monovinyl ether (c) is 4-hydroxy butyl vinyl ether.

30. The oligomer of claim 1 wherein the monovinyl ether (c) is 4-hydroxymethyl cyclohexylmethyl vinyl ether.

31. The oligomer of claim 1 wherein the monovinyl ether (c) is 2-hydroxy ethyl vinyl ether.

32. The oligomer of claim 1 wherein the monovinyl ether (c) is triethylene glycol monovinyl ether.

33. The oligomer of claim 1 wherein the monovinyl ether (c) is diethylene glycol monovinyl ether.

34. The polymer resulting from curing the oligomer of claim 1.

35. The polymer of claim 34 wherein said oligomer is cured by electron beam with a dosage of from about 0.1 to about 10 Mrads.

36. The polymer of claim 34 wherein said oligomer is cured by ultraviolet radiation.

37. The polymer of claim 34 wherein said oligomer is cured by heating.

* * * * *

UNITED STATES PATENT AND TRADEMARK OFFICE
CERTIFICATE OF CORRECTION

PATENT NO. : 5,019,636

DATED : May 28, 1991

INVENTOR(S) : Lapin et al

It is certified that error appears in the above-identified patent and that said Letters Patent is hereby corrected as shown below:

Column 3, line 18: "- n -" should read -- $-(CH_2)_n-$ --
         line 52: "diisocyante" should read --diisocyanate--

Column 4, line 46: after "glycol)" insert --,--
         line 55: "poly(polypylene)" should read --poly(propylene)--

Column 5, line 4: after "results" insert --,--
         line 15: after "ether" insert --,--
         line 51: after "solvents" insert --,--
         line 53: after "ethers" insert --,--

Column 6, line 59: after "recorded" insert --,--

Column 7, line 22: after "mol" insert --)--
         line 42: "Ari" should read --Air--

Column 9, line 21: "45.5" should read --45.4--

Column 10, line 47: after "triaryl" insert --sulfonium salt, coated onto test panels, and cured by UV--

Column 11, line 24: "cyclolkanes" should read --cycloalkanes--

UNITED STATES PATENT AND TRADEMARK OFFICE
CERTIFICATE OF CORRECTION

PATENT NO. : 5,019,636

DATED : May 28, 1991

INVENTOR(S) : Lapin et al

It is certified that error appears in the above-identified patent and that said Letters Patent is hereby corrected as shown below:

Column 12, line 53: after "claim" insert --1--.

Signed and Sealed this

Twenty-fifth Day of May, 1993

Attest:

MICHAEL K. KIRK

Attesting Officer

Acting Commissioner of Patents and Trademarks